United States Patent [19]

Pfohl et al.

[11] 4,302,338
[45] Nov. 24, 1981

[54] APPARATUS FOR METERING AND/OR DISTRIBUTING LIQUID MEDIA

[75] Inventors: Rainer Pfohl, Heusenstamm; Martin Grtischke, Karben; Jürgen Schubert, Bad Homburg, all of Fed. Rep. of Germany

[73] Assignee: Metallgesellschaft Aktiengesellschaft, Frankfurt, Fed. Rep. of Germany

[21] Appl. No.: 56,491

[22] Filed: Jul. 11, 1979

[30] Foreign Application Priority Data

Jul. 28, 1978 [DE] Fed. Rep. of Germany ....... 2833155

[51] Int. Cl.³ .............................................. C02B 3/08
[52] U.S. Cl. ................................. 210/752; 210/199; 137/561 A
[58] Field of Search .................. 210/62, 199, 752, 754; 137/561 A, 883

[56] References Cited

U.S. PATENT DOCUMENTS

| | | | |
|---|---|---|---|
| 2,168,404 | 8/1939 | Grant | 137/561 A |
| 2,193,696 | 3/1940 | Ramsaur | 137/561 A |
| 3,764,011 | 10/1973 | Owens | 210/199 |
| 3,808,123 | 4/1974 | Neel | 210/199 |
| 3,899,000 | 8/1975 | Ohlswager et al. | 137/561 A |
| 4,021,347 | 5/1977 | Teller et al. | 210/199 |
| 4,140,178 | 2/1979 | Ohlswager et al. | 137/561 A |
| 4,230,569 | 10/1980 | Lohrberg et al. | 210/754 |

FOREIGN PATENT DOCUMENTS

| | | |
|---|---|---|
| 1816526 | 5/1974 | Fed. Rep. of Germany . |
| 2610387 | 9/1977 | Fed. Rep. of Germany . |
| 2816522 | 10/1979 | Fed. Rep. of Germany . |

*Primary Examiner*—H. Jay Spiegel
*Attorney, Agent, or Firm*—Sprung, Felfe, Horn, Lynch & Kramer

[57] ABSTRACT

Apparatus for metering and/or distributing liquid media comprising a substantially horizontal manifold and a plurality of generally vertical discharge conduits which depend from said manifold, said discharge conduits comprising discharge tubes which are open at both ends and are liquid-tightly fitted in and depend from said manifold, each of said tubes having a top end disposed in an upper portion of the manifold and at least one lateral opening disposed above a joint between said tube and the manifold and within said manifold.

6 Claims, 3 Drawing Figures

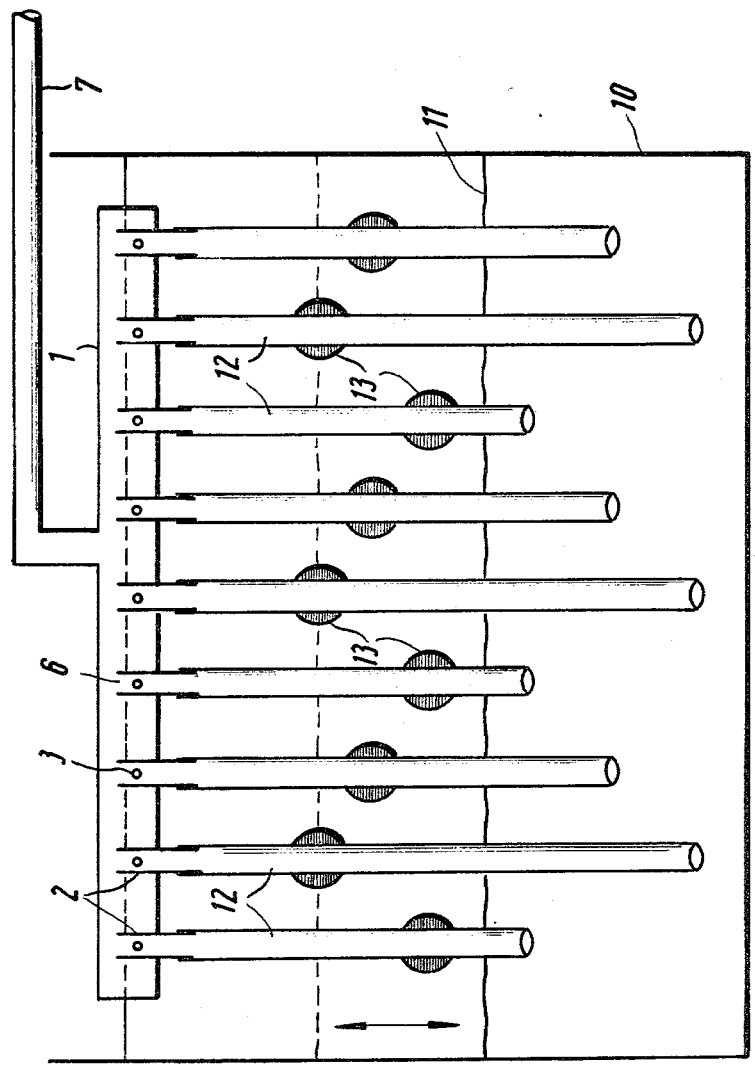

APPARATUS FOR METERING AND/OR DISTRIBUTING LIQUID MEDIA

BACKGROUND OF THE INVENTION

1. Field of the Invention

This invention relates to apparatus for metering and/or distributing liquid media which device comprises a manifold and a plurality of discharge conduits which depend from said manifold. This invention also relates to the use of the apparatus for supplying liquids which contain available chlorine into streams of cooling water having varying rates of flow.

2. Discussion of the Prior Art

There are numerous processes in which liquid media must be metered. It may be necessary to discharge liquid media, such as sulfuric acid, used for the drying of gases, as uniformly as possible onto the surface of packing contained in a tower, which is flown through by the gas from bottom to top, or to carry out reactions between gases and liquid media, e.g., in the production of hypochlorite from chlorine gas and sodium hydroxide solution in an operation which is similar to that described for the drying of gas. Apparatus for metering liquid media are also required, e.g., in numerous processes of treating water to which dissolved chemicals must be added, e.g., in order to precipitate or flocculate impurities or to disinfect the water.

In the processes mentioned hereinbefore it is essential that the metering be effected not only at a single point because this would necessitate a subsequent mixing, e.g., by mechanical means, and that the liquid medium is distributed as effectively as possible as it is discharged. For instance, when water is treated in a separate container, it is comparatively easy to effect a uniform distribution of the chemicals, e.g., if special feed pipes and intermediate plates are provided as well as radial partitions, which define a large number of separate chambers into which the conduits for discharging the chemicals open (German Patent Publication 18 16 526). Similar remarks are applicable to the manifold which is disclosed in Opened German Specification 26 10 387 and by which fluids are sprayed under pressure into a liquid to be treated and elastic hoses having a residual stress are fitted over the spray discharge openings and by the static pressure of the sewage are forced onto the openings in a closing sense whereas the fluid being sprayed tends to expand the hoses so as to provide a passage.

Difficulties will arise if the liquid medium is to be discharged into other flowing fluids, e.g., in the processes mentioned hereinbefore. These difficulties will be aggravated if the discharge rate of the medium is to be varied with time. That problem will arise, e.g., in processes of drying gases having a varying moisture content or in chemical processes in which the content of gaseous reactants in the gas varies. A special situation arises in the treatment of flowing water, e.g., in the chlorination of cooling water streams, for instance, with a hypochlorite solution, if the so-called continuous chlorination is to be combined with a so-called shock chlorination. In that case the chlorine discharge rate is to be increased for a short time, e.g., to two to ten times the normal rate. Because the same chlorinating agent is used, the liquid discharge rate is to be increased at the same ratio.

It is an object of the invention to provide an apparatus which is simple in structure and permits of an exact control of the metering rate and/or distribution of the liquid medium and of a change of the discharge rate in intervals of time.

SUMMARY OF THE INVENTION

This object is accomplished by an apparatus of the type described first hereinbefore comprising a substantially horizontal manifold and a plurality of generally vertical discharge conduits which depend from said manifold, said discharge conduits comprising discharge tubes which are open at both ends and are liquid-tightly fitted in and depend from said manifold, each of said tubes having a top end disposed in an upper portion of the manifold and at least one lateral opening disposed above a joint between said tube and the manifold and within said manifold.

If the discharge tube has one lateral opening, one can discharge the liquid medium at two different rates since liquid to be discharged from the tube at a first rate continuously enters the tube through the lateral opening and liquid to be discharged from the tube at a second rate in addition to the first at any desired time enters the tube through its open top end disposed in the upper portion of the manifold. This operation can be carried out if the liquid level is controlled to lie at one time closely above the lateral opening and at another time above the open top end of the discharge tube. This control is effected automatically if liquid at suitable rates is fed into the manifold.

Liquid at additional different rates can be discharged and distributed if each discharge tube has a plurality of lateral openings on different levels and the liquid level in the manifold is controlled accordingly.

The rate at which liquid is discharged and distributed can be further increased if the supply manifold, which is usually supplied with air, is provided with a check valve so that it is possible to control the discharge rate not only by the hydrostatic pressure, but also by the pump pressure, which can be varied. In dependence on the pump discharge pressure, the liquid discharge rate can then be varied to some extent by up to a maximum.

Depending on the application, an apparatus can be installed over a channel or a plurality of apparatus can be uniformly distributed over the cross-section of a packed tower.

When the apparatus is used in a packed tower, the rate control valve for controlling the rate of liquid to be distributed can be directly controlled by a detector in response to, e.g., the moisture content of a gas to be dried or the content of gaseous reactants in chemical processes. The control can also be made dependent on the nature of the fluid which leaves the packed tower, e.g., on the water content of sulfuric acid used for drying gas.

If the apparatus is used to treat flowing water, e.g., with solutions that contain available chlorine, for example a hypochlorite solution, a desirable further feature can be adopted which resides in that the lower ends of the discharge tubes are provided with hoses, which have outlet openings that are substantially uniformly distributed over the cross-section of flow. In connection with the distribution of chemicals in deep waters, a further improvement can be effected by the use of hoses which differ in length. In this way, a particularly good distribution of the chemical can be effected and will be further intensified by the pendulum-like oscillation of the hoses. If the last-mentioned feature is adopted for a discharge into open channels, it will also be desirable to provide the hoses with floats disposed on different levels. This ensures that in case of a change of the liquid level the outlet openings of the hoses are raised or lowered in adaptation to the new cross-section of flow. Depending on the field of use, the manifold, the discharge tubes and the hoses must be made from or coated with materials which resist the chemicals to be encountered. Such materials include, e.g., polytetrafluoroethylene, polypropylene or polyvinylchloride.

Whereas the apparatus can be used for a very large number of purposes, including the cases mentioned first hereinbefore, the apparatus is preferably used for discharging liquids that contain available chlorine at varying rates into cooling water streams. Owing to the rapid and intense distribution, the coarse and fine rakes and screens required to remove entrained solids which could otherwise damage pumps, coolers etc. can be provided on the downstream side of the apparatus, so that organisms, such as shells etc., cannot grow on such protective fixtures, as could be the case if they were installed in the non-chlorinated water on the upstream side of the metering apparatus. Because the available chlorine is effectively distributed in the stream of liquid, the protective fixtures can be made from conventional steel and it is unnecessary to use expensive titanium which is required in conjunction with conventional metering apparatus for reasons of strength.

BRIEF DESCRIPTION OF DRAWINGS

The invention will now be explained more fully and by way of example with reference to the drawings in which:

FIG. 3 is a diagrammatic view showing the apparatus provided with hoses in different lengths which are attached to the lower ends of the discharge tubes.

DESCRIPTION OF SPECIFIC EMBODIMENTS

Figure 1:
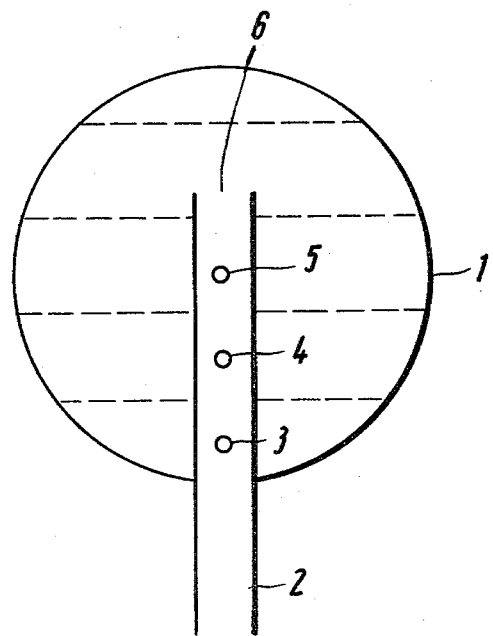
FIG. 1 is a sectional view showing a discharge tube of the apparatus.

FIG. 1 shows a manifold 1 and a discharge tube 2, which is fitted in the manifold and has three lateral openings, 3, 4, 5 and a top end opening 6. The liquid level can be varied as indicated by the dotted lines so that the liquid medium to be discharged and distributed enters the discharge tube 2 only through the lower lateral opening 3, through the two lower lateral openings 3 and 4, through all lateral openings 3, 4, 5, or through all openings 3, 4, 5, 6.

Figure 2:
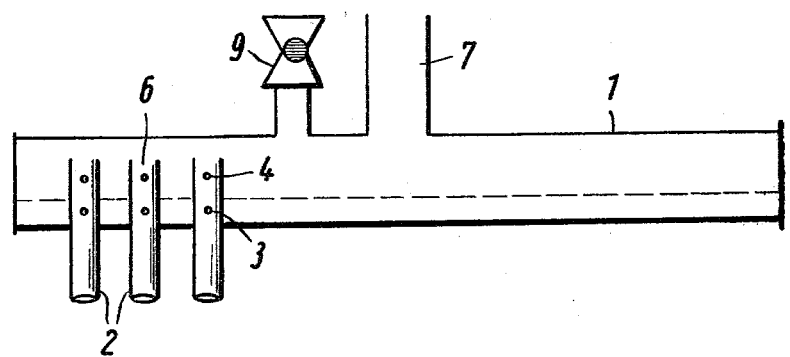
FIG. 2 is a sectional view showing the apparatus comprising a plurality of discharge tubes.

The apparatus shown in FIG. 2 comprises a manifold 1 and three discharge tubes, each of which has two lateral openings 3 and 4. The liquid medium is supplied via a conduit 7. A check valve 9 is provided and permits of using also the pump discharge pressure for a control of the rate of flow.

FIG. 3 illustrates the chlorination of cooling water by means of hypochlorite solution as an example of the discharge of a liquid medium. Cooling water is supplied to a power plant by a concrete-lined, open channel 10. The water level 11 may rise up to the dotted line. Hypochlorite solution having a concentration of, e.g., 2 g/l, calculated as available chlorine, is supplied to the cooling water via conduit 7. The manifold 1 is provided with diagrammatically indicated discharge tubes 2. Hoses 12 differing in length have been fitted on the tubes 2 so that the outlet openings are uniformly distributed over the cross-section of the water stream. The hoses 12 are provided with floats 13, which respond at different times to a rise of the water level and then cause the outlet openings to be raised so that a virtually uniform distribution of the outlet openings throughout the cross-section of flow is maintained.

The rate of hypochlorite solution is increased at intervals of time for a shock chlorination. As a result, the liquid level in the manifold 1 is raised above the inlet opening 6 of the discharge tubes 2. As a result, the hypochlorite solution supplied at a higher rate is distributed to the hoses 12 with a uniformity which is similar to that with which the smaller rate (for the continuous chlorination) is distributed.

What is claimed is:

1. A process for supplying a liquid treating agent to a flowing stream which flows in a generally horizontal path which comprises passing said liquid stream along said generally horizontal path in said channel, feeding said treating agent into a substantially horizontal manifold at varying amounts, said manifold being connected to a plurality of generally vertical discharge conduits which depend from said manifold, said discharge conduits comprising discharge tubes which are open at both ends and are liquid-tightly fitted in and depend from said manifold, each of said tubes having a top end disposed in an upper portion of the manifold and at least one lateral opening disposed above a joint between said tube and said manifold, and within said manifold, each of said discharge tubes having a hose attached to its lower end which hoses have outlet openings, said outlet openings being substantially uniformly distributed over the cross-section of flow of fluid of said flowing liquid, said hoses disposed in said flowing liquid such as to be pendulum-like oscillatable by said flowing liquid, whereby when liquid treating agent is passed through said manifold in an amount sufficient to pass through said lateral opening, but not through said top end, said treating agent is uniformly dispensed in said flowing liquid at a first dosage level and when said liquid treating agent is passed through said manifold in an amount sufficient to pass both through said lateral opening and said top ends, said treating agent is uniformly dispensed in said flowing liquid at a second dosage level.

2. A process according to claim 1 wherein the level of said treating agent in said manifold is sufficiently high that treating agent flows through said lateral opening and through said top end.

3. A process according to claim 1 wherein the level of treating agent in said manifold is sufficiently high that treating agent flows through said lateral opening but not through said top end.

4. A process according to claim 1, wherein said liquid treating agent is one containing available chlorine and said liquid which flows through said channel comprises a cooling water stream.

5. An apparatus for metering liquid treating agent to the plurality of dosage levels at different times into a liquid flowing through a channel which comprises a channel, means for flowing liquid to be treated through said channel, a substantial horizontal manifold, means for supplying said liquid treating agent at different amounts to said manifold, a plurality of generally vertical discharge conduits, each of which depend from said manifold and are in fluid communication therewith, said discharge conduits comprising discharge tubes which are open at both ends and are liquid-tightly fitted in and depend from said manifold, each of said tubes having a top end disposed in an upper portion of the manifold and at least one lateral opening disposed above a joint between said tube and said manifold, and within said manifold, each of said discharge tubes having a hose attached to its lower end which hoses have outlet openings, said outlet openings being substantially uniformly distributed over the cross-section of flow of a fluid, said hoses disposed in said liquid flowing through said channel such as to be pendulum-like oscillatable by said flowing liquid, whereby when liquid treating agent is passed through said manifold in an amount sufficient to pass through said lateral opening but not through said top end, said treating agent is uniformly dispensed in said flowing liquid at a first dosage level and when said liquid treating agent is passed through said manifold in an amount sufficient to pass through said lateral opening and said top end, said treating agent is uniformly dispensed in said flowing liquid at a second dosage level.

6. Apparatus according to claim 5 wherein the manifold contains a check valve adapted to cause a pump discharge pressure to be built up.

* * * * *